US 6,750,292 B2

(12) United States Patent
Dozeman et al.

(10) Patent No.: US 6,750,292 B2
(45) Date of Patent: Jun. 15, 2004

(54) THERMOPLASTIC VULCANISATE, THE THERMOPLASTIC VULCANISATE CONTAINING A FOAMING AGENT AND FOAM OF THE THERMOPLASTIC VULCANISATE

(75) Inventors: Albertus O. Dozeman, Born (NL); Yundong Wang, Leominster, MA (US)

(73) Assignee: DSM N.V., Heerlen (NL)

( * ) Notice: Subject to any disclaimer, the term of this patent is extended or adjusted under 35 U.S.C. 154(b) by 32 days.

(21) Appl. No.: 10/102,423

(22) Filed: Mar. 21, 2002

(65) Prior Publication Data

US 2002/0188076 A1 Dec. 12, 2002

Related U.S. Application Data

(63) Continuation of application No. PCT/NL00/00617, filed on Sep. 4, 2000
(60) Provisional application No. 60/154,959, filed on Sep. 21, 1999.

(51) Int. Cl.[7] ............................. C08L 23/02; C08L 23/10
(52) U.S. Cl. ...................... 525/191; 525/232; 525/240
(58) Field of Search ................................ 525/191, 232, 525/240

(56) References Cited

U.S. PATENT DOCUMENTS

| 4,130,535 A | | 12/1978 | Coran et al. | |
|---|---|---|---|---|
| 4,247,652 A | | 1/1981 | Matsuda et al. | |
| 6,100,334 A | * | 8/2000 | Abdou-Sabet | 525/191 |
| 6,121,383 A | * | 9/2000 | Abdou-Sabet et al. | 525/192 |

FOREIGN PATENT DOCUMENTS

| CA | 1267244 | 3/1990 |
|---|---|---|
| EP | 0547843 | 6/1993 |
| GB | 1550207 | 8/1979 |
| JP | 61021145 | 1/1986 |

* cited by examiner

*Primary Examiner*—Nathan M. Nutter
(74) *Attorney, Agent, or Firm*—Pillsbury Winthrop LLP

(57) ABSTRACT

Thermoplastic vulcanisate containing 5–70 parts by weight semi-crystalline polyolefine, 95–30 parts by weight rubber containing an at least partly vulcanised polymer, which polymer contains ethylene monomeric units, monomeric units derived from an alpha-olefine and monomeric unit derived from a non-conjugated polyene, and oil whereby the sum of the concentration of aromatic compounds and the concentration of polar compounds in the oil being less than 4.5 wt. %.

9 Claims, No Drawings

THERMOPLASTIC VULCANISATE, THE THERMOPLASTIC VULCANISATE CONTAINING A FOAMING AGENT AND FOAM OF THE THERMOPLASTIC VULCANISATE

CROSS-REFERENCE TO RELATED APPLICATIONS

This is a Continuation of International Application No. PCT/NL00/000617 filed Sep. 4, 2000 which designated the U.S. and was published in the English language. This application also claims the benefit of U.S. Provisional application No. 60/154,959 filed Sep. 21, 1999. The contents of both applications are incorporated in their entirety by reference.

The invention relates to a thermoplastic vulcanisate containing a semi-crystalline polyolefine and a rubber, which rubber contains an at least partially vulcanised polymer and oil.

Such a thermoplastic vulcanisate is for example known from WO-98/37131.

It is possible to prepare a thermoplastic vulcanisate by mixing and kneading the polyolefine and the not yet vulcanised polymer and the oil above the softening point of the thermoplastic semi-crystalline polyolefine and at least partly vulcanising the polymer during mixing and kneading. Vulcanisation in this way is also known as dynamic vulcanisation. Dynamic vulcanisation results in a thermoplastic vulcanisate (hereafter to be referred to as a TPV) with rubber-like behaviour, which can nevertheless still be processed as a thermoplastic polymer.

For the processing as a thermoplastic polymer, high requirements are imposed with respect to the rheological properties of the TPV, such as melt strength, die swell and resistance to melt fracture.

In addition, the rubber-like properties are important, such as flexibility and resistance to permanent deformation.

The invention aims to provide a TPV that possesses an optimum combination of the aforementioned properties.

This aim is achieved by the TPV of the invention containing the following components: 5–70 parts by weight semi-crystalline polyolefine, 95–30 parts by weight rubber containing an at least partly vulcanised polymer, which polymer contains ethylene monomeric units, monomeric units derived from an alpha-olefine and monomeric units derived from a non-conjugated polyene, and oil whereby the sum of the concentration of aromatic compounds and the concentration of polar compounds in the oil being less than 4.5 wt. %. Surprisingly the TPV according to the invention has very good rheological properties and very good mechanical properties. The TPV is for example suitable for injection-moulding or extruding objects with a complex geometry and having a high resistance to permanent deformation.

Another advantage of the TPV according to the invention is that no, or only very little, fume evolves during the processing of the TPV. The TPV can moreover very well be produced in bright colours.

It has also surprisingly been found that, processed under the same conditions via a foam extruder or a foam-injection-moulding machine, the TPV according to the invention can be used to obtain a foam with a lower density and with an even better surface quality compared with the known TPVs.

As the semi-crystalline polyolefine use can be made for example of homopolymers of ethylene or propylene, or of copolymers containing ethylene and/or propylene monomeric units. Examples are copolymers of ethylene and propylene or an alpha-olefine with 4–12 C atoms and copolymers of propylene and an alpha-olefine with 4–12 C atoms. Of essential importance is that the concentration of ethylene or the concentration of propylene in the copolymers is so high that the copolymer is semi-crystalline. In the case of statistical copolymers this is usually achieved at an ethylene content or a propylene content of approximately 70 mol. % or more.

Preferably use is made of polypropylene. Examples of polypropylene are polypropylene block copolymers, statistical copolymers of propylene and up to approximately 6 mol. % ethylene and homopolymers of propylene. Most preferably use is made of a homopolymer of propylene. If use is made of polypropylene then its melt index is for example less than 2 dg/min. (230° C., 2.16 kg); preferably the melt index is 0.1–0.6 dg/min., even more preferably 0.3–0.5 dg/min.

The at least partly vulcanised polymer, hereafter to be referred to as at least partly vulcanised EPDM, preferably contains 50–70 parts by weight ethylene monomeric units, 48–30 parts by weight monomeric units derived from an alpha-olefine and 2–12 wt. % monomeric units derived from a non-conjugated diene. Propylene is preferably used as the alpha-olefine. Dicyclopentadiene (DCPD) or 5-ethylidene-2-norbornene (ENB) is preferably used as the non-conjugated polyene. Also more than one non-conjugated polyene may be used. Preferably dicyclopentadiene or 5-ethylidene-2-norbornene is used together with vinylnorbornene (VNB).

The oil that is used in the rubber contained in the TPV according to the invention is commercially available. Good results are obtained with PennzUltra (TM) 1199, supplied by Pennzoil in the United States of America. The concentration of aromatic compounds in the oil is preferably less than 4 wt. % and the concentration of polar compounds less than 0.3 wt. %. The concentration of aromatic compounds is more preferably less than 2 wt. %, even more preferably less than 1 wt. %. The concentration of polar compounds is more preferably less than 0.2 wt. %, even more preferably less than 0.1 wt. %.

The oil has preferably been prepared with the aid of the hydrocracking and isodewaxing process, for example the Paralux process developed by Chevron. The oil's viscosity is preferably at least 85 cSt measured at 40° C., even more preferably 90–250 cSt measured at 40° C. The oil/EPDM ratio of the rubber in the TPV according to the invention is for example between 0.7 and 2.0, preferably between 1.3 and 1.6. The TPV according to the invention preferably contains 5–25 wt. % semi-crystalline polyolefine and 95–75 wt. % rubber, even more preferably the TPV according to the invention contains 12–20 wt. % semi-crystalline polyolefine and 80–88 wt. % rubber. Such a TPV is very suitable for use in a foam.

The TPV is prepared by dynamic vulcanisation of a mixture containing the semi-crystalline polyolefine and the EPDM. This can for example be effected by feeding the semi-crystalline polyolefine and the EPDM in separate streams or in the form of a dry blend to a mixing and kneading apparatus, such as an internal mixer or a twin-screw kneader. In the mixing and kneading apparatus heating is effected to above the polyolefine's softening point, usually to above the polyolefine's crystalline melting point. The vulcanisation can then be initiated by adding a vulcanising agent to the mixture. It is also possible for the vulcanising agent to be present in the mixture already from the beginning of the mixing and kneading process, and for vulcanisation to be initiated after the temperature has risen sufficiently. A frequently used vulcanisation temperature is between the polyolefine's melting point (130° C. in the case of polyethylene, 165° C. in the case of polypropylene) and 250° C. The vulcanisation time is for example between 0.5 and 10 minutes. It is important that the mixture be kneaded during the vulcanisation, to ensure that the TPV can be processed as a thermoplastic material. It is preferred for the TPV to be at least 95% vulcanised, preferably at least 98%. The degree of vulcanisation can be determined by measuring the amount of rubber that is soluble in boiling xylene. The degree of vulcanisation is then calculated with the aid of formula I:

Degree of vulcanisation=$(A-B)/A \times 100\%$, (I)

where A is: the total amount of rubber and B: the amount of rubber dissolved in boiling xylene. As the vulcanising agents use can be made of for example a peroxide or a phenol resin optionally in the presence of a suitable accelerator. Such vulcanising agents are known to a person skilled in the art. The oil may already have been mixed with the not yet vulcanised EPDM that is added to the kneader. It is also possible to separately add all or part of the oil during the kneading process. Fillers and additives may be added before, during or after vulcanisation. If fillers or additives have an adverse effect on the vulcanisation process or have limited thermal stability, they are of course preferably added after vulcanisation.

The invention also relates to TPV according to the invention that contains a foaming agent, and to a foam of the TPV according to the invention. The TPV according to the invention can be processed into a foam with a low density and a good surface quality via an extruder or an injection-moulding machine.

Extruders and injection-moulding machines for foaming TPV and suitable foaming agents are known to a person skilled in the art. Preferably use is made of foaming agents that split off water during heating, as described in WO 98/37131.

Preferably the TPV according to the invention is used to prepare a moulded part via a foam extruder. A highly suitable foamed moulded part has a density of 400–650 kg/m³.

The invention will be further elucidated with reference to the examples.

Components Used

Polypropylene: homopolymer with a melt index of 0.3 dg/min. (230° C., 2.16 kg, ASTM 1238)

EPDM: polymer of ethylene, propylene and ENB in a ratio of 63/32.5/4.5 wt. % and a Mooney of 52 ML(1+4) 125° C. (ASTM D-927)

oil A: PennzUltra 1199 (TM), supplied by Pennzoil, USA, viscosity 118 cSt (measured at 40° C. according to ASTM D-445), concentration of aromatic compounds 0.2 wt. % (ASTM-2007), concentration of polar compounds 0.0 wt. % (ASTM 2007) oil B: Sunpar 150C (TM), supplied by Sun Oil, USA, viscosity 95 cSt (measured at 40° C.), concentration of aromatic compounds 13.6 wt. %, concentration of polar compounds 0.6 wt. %.

Preparation of the TPV

A Werner and Pfleiderer ZSK 40 (TM) twin-screw kneader, supplied by Werner and Pfleiderer, Germany, was fed with a mixture that contained the following components:

polypropylene: 60 parts by weight
EPDM: 100 parts by weight
oil A or B: 140 parts by weight.

The temperature of the kneader was 220° C., the screw speed was 350 rpm, the throughput was 40 kg/hour. Next, the TPV thus prepared and aluminium hydroxide (aluminium trihydrate, ATH) were in a weight-based mixing ratio of 70/30 fed to a Ferro (TM) continuous mixer supplied by Ferro, USA, and mixed and granulated at a temperature below 200° C.

The granulate thus obtained was processed into a foamed bar with the aid of a Killion (TM) extruder with a general-purpose screw with a diameter of 25 mm and an L/D of 25. The head had a round outlet with a diameter of 2.4 mm and an L/D of 45. The extruder had a temperature of 220° C. in the first zone (first 8D after the filling opening), the temperature of the second zone (second 8D) was varied, the temperature of the third zone was 165° C. and the head temperature was 175° C.

The bar's foam density was measured according to ASTM D-792.

EXAMPLE I

Comparative Experiment A

Foam samples were prepared as described above. Oil A was used in Example I and Oil B in Comparative Experiment A. The temperature of the second zone of the foam extruder was adjusted to different temperatures. The results are presented in Table I.

TABLE I

| | Density (kg/m³) | |
| --- | --- | --- |
| Temp. of 2nd zone (° C.) | Example I | Comp. Exp. A |
| 260 | 255 | 246 |
| 255 | 295 | 307 |
| 250 | 322 | 349 |
| 245 | 355 | 377 |

The results show that the foam samples according to the invention (Example I) generally have a lower density.

EXAMPLE II

Comparative Experiment B

Foam samples were prepared as described above, except that 45 parts by weight propylene instead of 60 parts by weight polypropylene and 160 parts by weight oil instead of 140 parts by weight oil were fed to the twin-screw kneader in the mixture. Oil A was again used in Example 2 and oil B again in Comparative Experiment B. The temperature of the second zone of the foam extruder was adjusted to different temperatures. The results are presented in Table II.

TABLE II

| | Density (kg/m³) | |
| --- | --- | --- |
| Temp. of 2nd zone (° C.) | Example II | Comp. Exp. B |
| 260 | 263 | 318 |
| 255 | 337 | 377 |
| 250 | 408 | 447 |
| 245 | 473 | 499 |

The results show that the foam samples according to the invention (Example 2) have a lower density.

What is claimed is:

1. Thermoplastic vulcanisate containing:
5–70 parts by weight semi-crystalline polyolefine, 95–30 parts by weight rubber containing an at least partly vulcanised polymer and oil, which polymer contains ethylene monomeric units, monomeric units derived from an alpha-olefine and monomeric units derived from a non-conjugated polyene, the sum of the concentration of aromatic compounds and the concentration of polar compounds in the oil being less than 4.5 wt. %.

2. Thermoplastic vulcanisate according to claim 1, wherein the concentration of aromatic compounds in the oil is less than 4 wt. % and the concentration of polar compounds is less than 0.3 wt. %.

3. Thermoplastic vulcanisate according to claim 1, wherein the concentration of aromatic compounds in the oil is less than 2 wt. %.

4. Thermoplastic vulcanisate according to claim 1, wherein the concentration of polar compounds in the oil is less than 0.2 wt. %.

5. Thermoplastic vulcanisate according to claim 1, wherein the concentration of aromatic compounds in the oil is less than 1 wt. %.

6. Thermoplastic vulcanisate according to claim 1, wherein the concentration of polar compounds in the oil is less than 0.1 wt. %.

7. Thermoplastic vulcanisate according to claim 1, wherein the oil has been prepared via the hydrocracking and isodewaxing process.

8. Thermoplastic vulcanisate according to claim 1, wherein the oil has a viscosity of at least 85 cSt at 40° C.

9. Thermoplastic vulcanisate according to claim 1, wherein the thermoplastic vulcanisate contains a foaming agent.

* * * * *